United States Patent
Li et al.

(10) Patent No.: US 12,082,028 B2
(45) Date of Patent: Sep. 3, 2024

(54) APPARATUS, METHOD FOR USER EQUIPMENT, USER EQUIPMENT AND METHOD FOR NETWORK ELEMENT TO CONFIGURE MEASUREMENT GAP (MG) PATTERNS

(71) Applicant: Apple Inc., Cupertino, CA (US)

(72) Inventors: Qiming Li, Beijing (CN); Jie Cui, San Jose, CA (US); Yang Tang, San Jose, CA (US); Dawei Zhang, Saratoga, CA (US); Manasa Raghavan, Sunnyvale, CA (US); Xiang Chen, Campbell, CA (US); Huaning Niu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/439,559

(22) PCT Filed: Jan. 15, 2021

(86) PCT No.: PCT/CN2021/072102
§ 371 (c)(1),
(2) Date: Sep. 15, 2021

(87) PCT Pub. No.: WO2022/151339
PCT Pub. Date: Jul. 21, 2022

(65) Prior Publication Data
US 2023/0345276 A1  Oct. 26, 2023

(51) Int. Cl.
*H04B 17/20* (2015.01)
*H04B 17/382* (2015.01)
(Continued)

(52) U.S. Cl.
CPC .......... *H04W 24/10* (2013.01); *H04B 17/252* (2023.05); *H04B 17/382* (2015.01);
(Continued)

(58) Field of Classification Search
CPC .... H04B 17/0082–3913; H04J 11/0023–0093; H04J 2011/0003–0096;
(Continued)

(56) References Cited

U.S. PATENT DOCUMENTS

| 2018/0084448 A1* | 3/2018 | Yang | H04W 24/10 |
| 2022/0217562 A1* | 7/2022 | Tang | H04W 24/10 |

(Continued)

FOREIGN PATENT DOCUMENTS

| CN | 110740050 A | 1/2020 |
| WO | WO 2020/092732 A1 | 5/2020 |

OTHER PUBLICATIONS

International Search Report and Written Opinion of the International Searching Authority directed to related International Patent Application No. PCT/CN2021/072102, mailed Oct. 21, 2021; 9 pages.

(Continued)

*Primary Examiner* — Timothy J Weidner
(74) *Attorney, Agent, or Firm* — Sterne, Kessler, Goldstein & Fox P.L.L.C.

(57) ABSTRACT

An apparatus is provided. The apparatus comprises: processor circuitry configured to cause a user equipment (UE) to: encode a message for transmission to a network (NW) including a UE capability information that includes an indication of whether concurrent measurement gap (MG) patterns are supported by the UE; and transmit the message to the NW.

20 Claims, 12 Drawing Sheets

(51) Int. Cl.
| | |
|---|---|
| *H04W 8/24* | (2009.01) |
| *H04W 24/08* | (2009.01) |
| *H04W 24/10* | (2009.01) |
| *H04W 36/00* | (2009.01) |
| *H04W 56/00* | (2009.01) |
| *H04W 72/0446* | (2023.01) |
| *H04W 72/0453* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ............ *H04W 8/24* (2013.01); *H04W 24/08* (2013.01); *H04W 36/0088* (2013.01); *H04W 36/0094* (2013.01); *H04W 56/0015* (2013.01); *H04W 72/0446* (2013.01); *H04W 72/0453* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ............ H04L 5/0001–0098; H04W 8/18–245; H04W 16/02–16; H04W 24/02–10; H04W 28/02–26; H04W 36/0005–385; H04W 48/02–20; H04W 56/0005–0095; H04W 72/02–569; H04W 74/002–008; H04W 84/02–16; H04W 88/005–188; H04W 92/02–04; H04W 92/10
See application file for complete search history.

(56) References Cited

U.S. PATENT DOCUMENTS

| | | | |
|---|---|---|---|
| 2023/0156543 A1* | 5/2023 | Xie | H04W 24/10 |
| 2023/0337034 A1* | 10/2023 | Li | H04W 24/10 |
| 2023/0362697 A1* | 11/2023 | Li | H04W 24/10 |

OTHER PUBLICATIONS

Apple: 'On new positioning measurement gaps', 3GPP Draft; R4-2009913, 3GPP TSG-RAN4 Meeting #96-e, Online, Aug. 2020; 5 pages.

MediaTek Inc., Intel Corporation: 'Work plan of R17 NR and MR-DC measurement gap enhancements WI', 3GPP Draft; R4-2014628, 3GPP TSG-RAN WG4 Meeting #97-e, Electronic Meeting, Nov. 2020; 3 pages.

3GPP Ts 38.104 V15.4.0, 3rd Generation Partnership Project; Technical Specification Group Radio Access Network; NR; Base Station (BS) radio transmission and reception (Release 15), Dec. 2018; 208 pages.

3GPP Ts 38.133 V15.4.0, 3rd Generation Partnership Project; Technical Specification Group Radio Access Network; NR; Requirements for support of radio resource management (Release 15). Dec. 2018; 876 pages.

* cited by examiner

600 encode a message for transmission to a network (NW) including a UE capability information that includes an indication of whether the UE supports concurrent measurement gap (MG) patterns
602 transmit the message to the NW
604

FIG. 6

700 encode a message for transmission to a network (NW) including a UE capability information that includes an indication of concurrent first and second measurement gap (MG) patterns that are supported by the UE, wherein the first MG pattern is independent with the second MG pattern
702 transmit the message to the NW
704

FIG. 7

800 receive a message from a user equipment (UE) including a UE capability information that includes an indication of concurrent measurement gap (MG) patterns
802 determine, for each of measurement objectives for the UE, an associated MG pattern from the concurrent MG patterns
804 encode a message for transmission to the UE including measurement objective information that includes an indication of the measurement objectives and associated MG patterns
806 transmit the message to the UE
808

FIG. 8

APPARATUS, METHOD FOR USER EQUIPMENT, USER EQUIPMENT AND METHOD FOR NETWORK ELEMENT TO CONFIGURE MEASUREMENT GAP (MG) PATTERNS

This application is a U.S. National Phase of International Application No. PCT/CN2021/072102, filed Jan. 15, 2021, which is hereby incorporated by reference in its entirety.

FIELD OF THE INVENTION

The present disclosure may relate in general to a field of wireless communications, and more particularly to apparatus, methods for user equipment, user equipment and methods for network elements.

BACKGROUND OF THE INVENTION

In order to facilitate smooth network transitions (e.g., cell handovers, redirection, reselection, or the like) with high a quality of experience (QoE), a user equipment (UE) has to have the capability to measure surrounding cells and provide related data to the network (NW). The UE may need measurement gaps (MG) to perform measurements when it cannot measure the target frequency while simultaneously transmitting/receiving on the serving cell.

SUMMARY OF THE INVENTION

An aspect of the present disclosure mainly aims to apparatus, methods for user equipment, user equipment and methods for network elements.

In accordance with some exemplary embodiments of the present disclosure, an apparatus is provided. The apparatus may comprise: processor circuitry configured to cause a user equipment (UE) to: encode a message for transmission to a network (NW) including a UE capability information that includes an indication of whether concurrent measurement gap (MG) patterns are supported by the UE; and transmit the message to the NW.

In accordance with some exemplary embodiments of the present disclosure, a method for a user equipment (UE) is provided. The method may comprise: encoding a message for transmission to a network (NW) including a UE capability information that includes an indication of concurrent first and second measurement gap (MG) patterns that are supported by the UE, wherein the first MG pattern is independent with the second MG pattern; and transmitting the message to the NW.

In accordance with some exemplary embodiments of the present disclosure, a user equipment (UE) is provided. The UE may comprise: processor circuitry configured to cause the UE to perform any one of the above mentioned methods.

In accordance with some exemplary embodiments of the present disclosure, an apparatus for operating a user equipment (UE) is provided. The apparatus may comprise: processor circuitry configured to cause the UE to perform any one of the above mentioned methods.

In accordance with some exemplary embodiments of the present disclosure, a method for a network element is provided. The method may comprise: receiving a message from a user equipment (UE) including a UE capability information that includes an indication of concurrent measurement gap (MG) patterns; determining, for each of measurement objectives for the UE, an associated MG pattern from the concurrent MG patterns; encoding a message for transmission to the UE including measurement objective information that includes an indication of the measurement objectives and associated MG patterns; and transmitting the message to the UE.

In accordance with some exemplary embodiments of the present disclosure, a non-transitory computer-readable memory medium is provided. The non-transitory computer-readable memory medium may store program instructions, where the program instructions, when executed by a computer system, cause the computer system to perform any one of the above mentioned methods.

In accordance with some exemplary embodiments of the present disclosure, a computer program product is provided. The computer program product may comprise program instructions which, when executed by a computer, cause the computer to perform any one of the above mentioned methods.

BRIEF DESCRIPTION OF THE DRAWINGS

The above and other aspects and advantages of the present disclosure will become apparent from the following detailed description of exemplary embodiments taken in conjunction with the accompanying drawings which illustrate, by way of example, the principles of the present disclosure. Note that the drawings are not necessarily drawn to scale.

FIG. 6 is a flowchart diagram illustrating an example method for a UE, according to some embodiments;

FIG. 7 is a flowchart diagram illustrating an example method for a UE, according to some embodiments;

FIG. 8 is a flowchart diagram illustrating an example method for a NW element, according to some embodiments;

Figure 1:
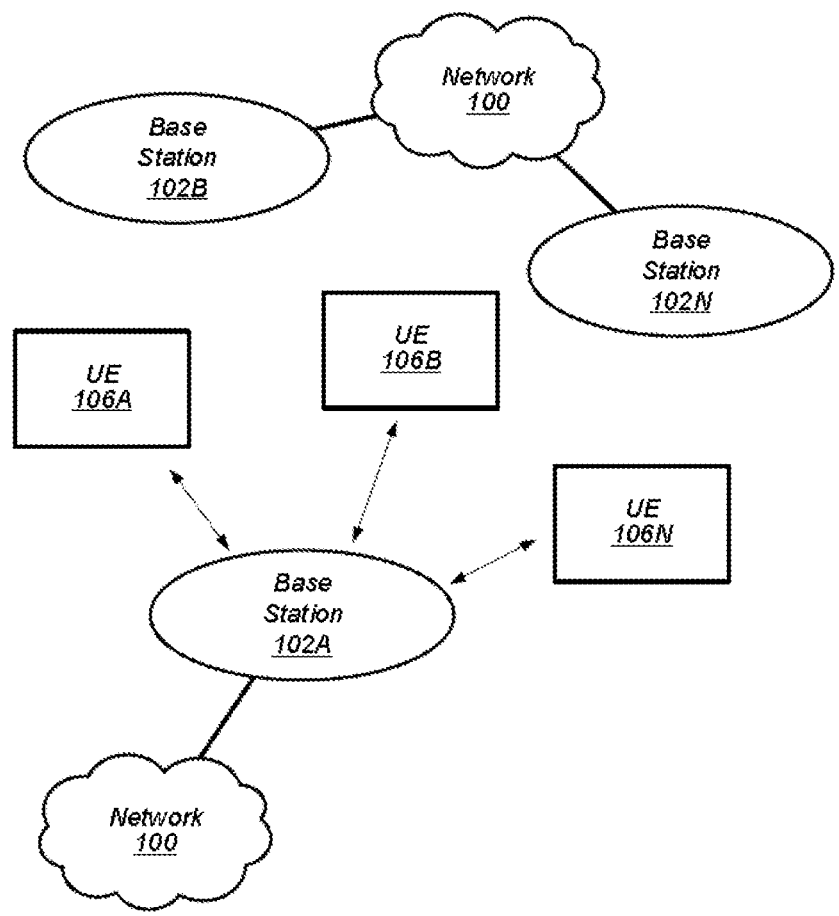
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE PREFERRED EMBODIMENTS

Exemplary Terminology

For the purposes of the present document, the following terms and definitions are applicable to the examples and embodiments discussed herein, but are not meant to be limiting.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry".

The term "user equipment" (UE) (or "UE device") as used herein refers to, is part of, or includes any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

The term "base station" has the full breadth of its ordinary meaning, and at least includes a wireless communication station installed at a fixed location and used to communicate as part of a wireless telephone system or radio system.

The term "network element" as used herein refers to physical or virtualized equipment and/or infrastructure used to provide wired or wireless communication network services. The term "network element" may be considered synonymous to and/or referred to as a network device, networked computer, networking hardware, network equipment, network node, router, switch, hub, bridge, radio network controller, RAN device, RAN node, gateway, server, virtualized VNF, NFVI, and/or the like. The term "base station" may be considered synonymous to, and may be referred to as, "network element".

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "band" has the full breadth of its ordinary meaning, and at least includes a section of spectrum (e.g., radio frequency spectrum) in which channels are used or set aside for the same purpose.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

The phrase "in various embodiments", "in some embodiments", and the like may refer to the same, or different, embodiments. The terms "comprising", "having", and "including" are synonymous, unless the context dictates otherwise. The phrase "A and/or B" means (A), (B), or (A and B). The phrases "A/B" and "A or B" mean (A). (B), or (A and B), similar to the phrase "A and/or B". For the purposes of the present disclosure, the phrase "at least one of A and B" means (A), (B), or (A and B). The description may use the phrases "in an embodiment", "in embodiments", "in some embodiments", and/or "in various embodiments", which may each refer to one or more of the same or different embodiments. Furthermore, the terms "comprising", "including", "having", and the like, as used with respect to embodiments of the present disclosure, are synonymous.

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell". The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells. "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Figure 2:
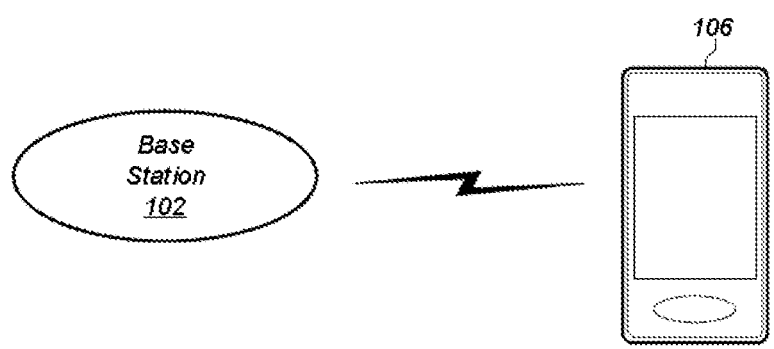
FIG. 2 illustrates a base station (BS) in communication with a user equipment (UE) device, according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Block Diagram of a UE

Figure 3:
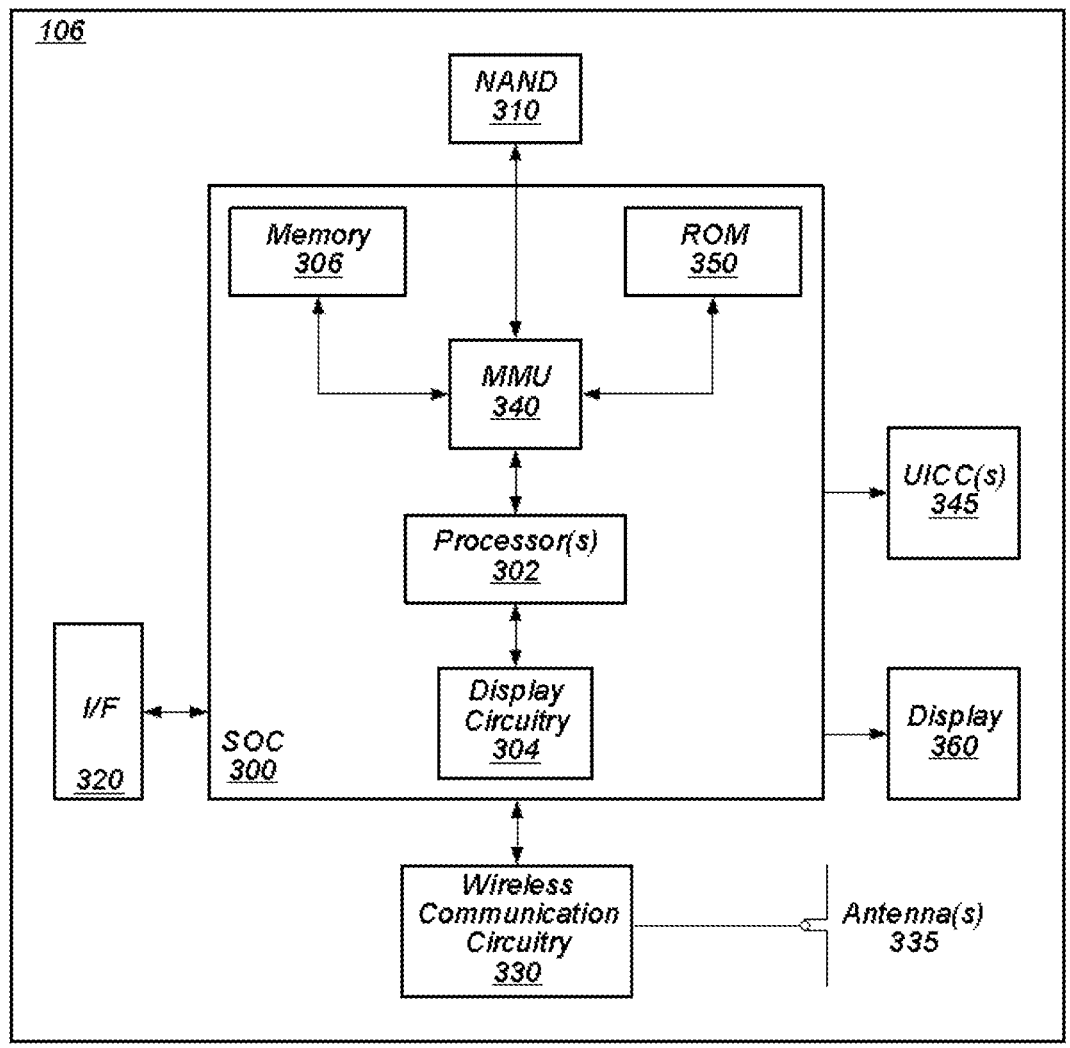
FIG. 3 illustrates an example block diagram of a UE, according to some embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Block Diagram of a Base Station

Figure 4:
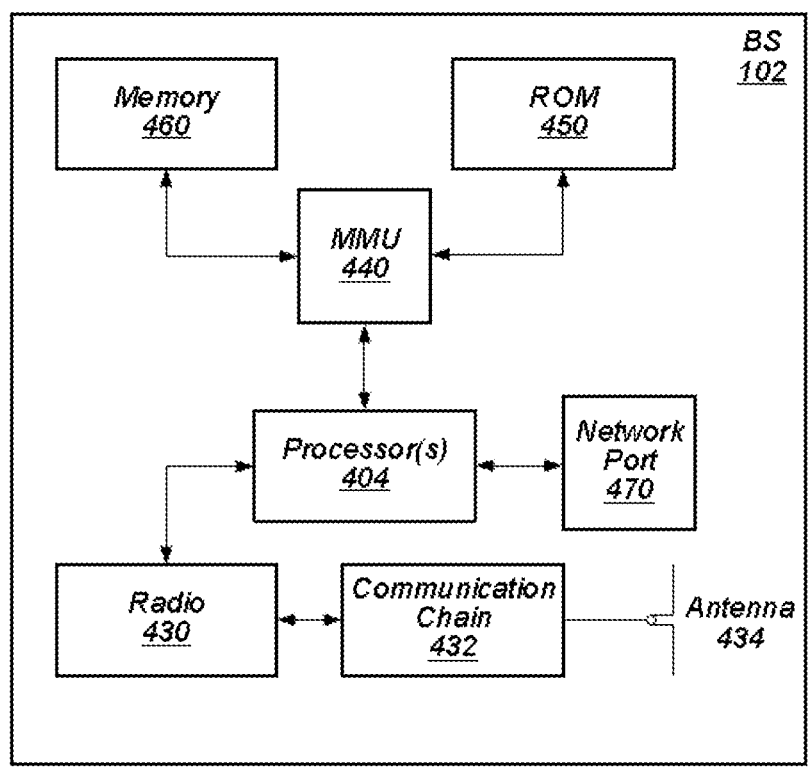
FIG. 4 illustrates an example block diagram of a BS, according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Block Diagram of Cellular Communication Circuitry

Figure 5:
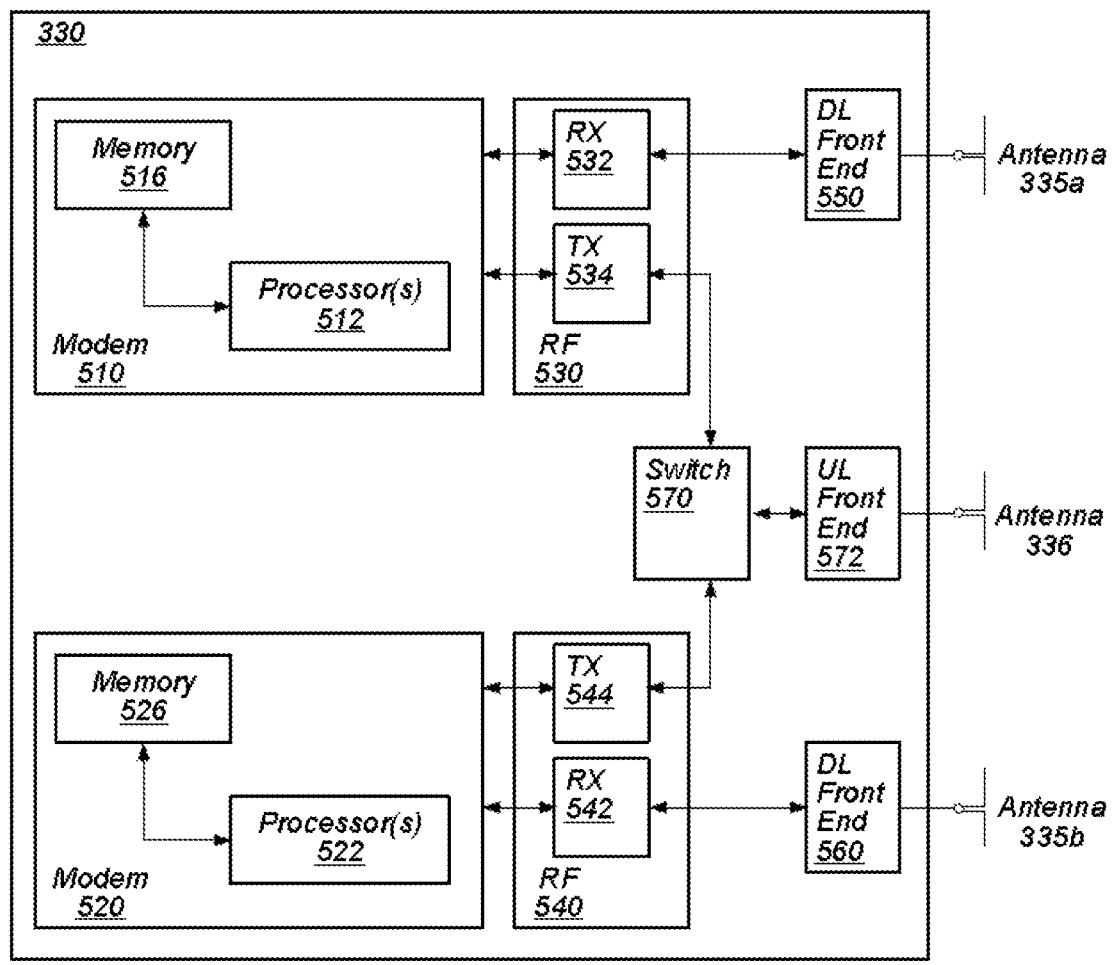
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Exemplary Possible Concurrent MG Pattern Schemes

Among other things, embodiments described herein are directed to measurement gaps (MGs) for new radio (NR) systems. Embodiments of the present disclosure may be utilized in conjunction with measurements performed by a UE, including intra-frequency and inter-frequency radio resource management (RRM) measurements. Embodiments of the present disclosure may be utilized in conjunction with messages transmitted and/or received via radio resource control (RRC) signaling between a UE and a network element (e.g., a BS).

According to embodiments of the present disclosure, concurrent MG patterns may be configured for a UE by a NW in response to the UE supports concurrent MG patterns. The term "concurrent MG patterns" as used herein refers to multiple MG patterns configured for one UE to perform one or more measurements in the same time period. A UE is configured with multiple concurrent MG patterns in the same time period, and these MG patterns are independent of each other. Any two of the multiple concurrent MG patterns may have different pattern configurations or have an identical pattern configuration, including measurement gap length (MGL), measurement gap repetition period (MGRP), measurement gap timing advance (MGTA), gap offset configuration and the like. The UE may use one of concurrent MG patterns to perform one measurement and use another of the concurrent MG patterns to perform another measurement, may use one or more of the concurrent MG patterns to perform one measurement, or may use one of the concurrent MG patterns to perform one or more measurements.

Figure 9:
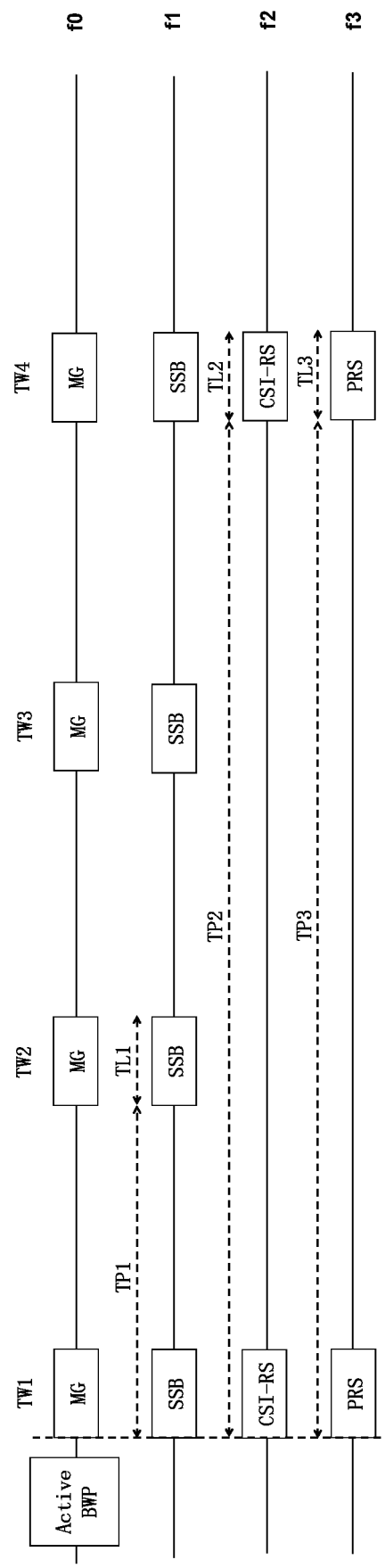
FIG. 9 illustrates a conventional MG pattern scheme for different measurement types.

FIG. 9 illustrates a conventional MG pattern scheme for different measurement types. A UE is working on carrier 10, or, more specifically, on an active bandwidth part (BWP). The UE is configured with three measurement objectives, including synchronization signal (SS)/physical broadcast channel (PBCH) block (SSB) based L3 measurement on carrier f1, channel state information reference signal (CSI-RS) based L3 measurement on carrier f2 and positioning reference signal (PRS) measurement for positioning purpose on carrier f3. Since the frequency of the carrier f1, f2 or f3 is different from the frequency of the carrier f which the UE is working on, the UE may need MGs to perform measurements on the target carriers f1, f2 and f3, and data transmission and reception on carrier f) will be suspended during the MGs.

Since only one MG pattern is configured in a time period, the UE will take the MGs in the same MG pattern to measure these three measurement objectives. To facilitate measurement by UEs, the NW may arrange the measurement objectives in the time domain to align them in time, as shown in FIG. 9. The SSB transmission periodicity is TP1 and duration is TL1, CSI-RS transmission periodicity is TP2 and duration is TL2, and PRS transmission periodicity is TP3 and duration is TL3. In order to cover all these measurement objectives with MGs from a single MG pattern, the gap pattern for these MGs may need to match the longest transmission periodicity and the shortest duration amongst those of the measurement objectives. That is, the configuration of the MG pattern may have a relatively long MGL and a relatively short MGRP, which may mean relatively high MG overheads.

In the shown example, the transmission periodicity TP2 is equal to TP3 and is three times the transmission periodicity TP1. Among the time windows TW1 through TW4, the SSB occasion on carrier f1 is at least partially overlapped with CSI-RS occasion on carrier f2 and with PRS occasion on carrier f3 within the time window TW1 or TW4. The UE may choose a measurement objective from the SSB, CSI-RS and PRS to perform measurement within these collision time window. For example, the UE may perform CSI-RS based measurement on carrier f2 within TW1 and perform PRS measurement on carrier f3 within TW4. For another example, the UE may perform SSB based measurement on carrier f1 within TW1, perform CSI-RS based measurement on carrier f2 within TW4, and perform PRS measurement on carrier f3 within the next collision time window. That is to say, it may take three times the longest transmission periodicity (that is TP2 or TP3 in the example shown in FIG. 9) before the UE may complete the measurements for all the three measurement objectives. Since only SSB occasion on carrier f1 occurs within the time window TW2 or TW3, the UE may perform SSB based measurement within TW2 or TW3.

Figure 10:
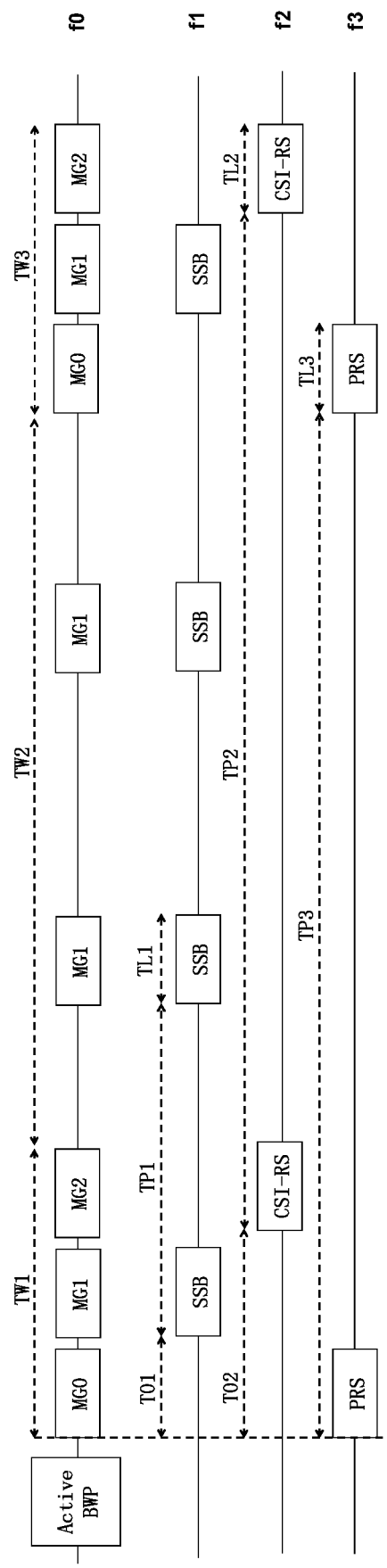
FIG. 10 illustrates an aspect of an exemplary possible concurrent MG pattern scheme for different measurement types, according to some embodiments.

FIG. 10 illustrates an aspect of an exemplary possible concurrent MG pattern scheme for different measurement types, according to some embodiments. The term "measurement type" or "type of measurement" as used herein may refer to the term "measurement category" defined in the 3GPP specification. e.g., Table 9.1.4.2-1 in TS 38.133 in some embodiments, or may refer to measurements for different signals, including SSB, CSI-RS, PRS, SRS, GNSS, PSBCH, PSSCH, PSCCH for 5G NR and CRS for LTE. A UE may be configured with different concurrent measurement gap patterns to perform different types of measurement. In the shown example, similar to that shown in FIG. 9, the UE is working on carrier f0 and is configured with three measurement objectives, including SSB based L3 measurement on carrier f1, CSI-RS based L3 measurement on carrier 2 and PRS measurement for positioning purpose on carrier 3. The descriptions of the same or similar elements as those in FIG. 9 are omitted.

Unlike the example shown in FIG. 9, three concurrent and independent MG patterns are configured for the UE The MGs having a first gap pattern from the three concurrent MG patterns are marked as MG1 in the figure. Since the MGs marked as MG1 (referred to as "MG1" hereinafter for simplicity) are used for the SSB based measurement as shown in the figure, the gap pattern configuration of MG1 matches the configuration of SSB. That is, the MGL of MG1 will cover the SSB duration TL1 (the term "cover" as used herein includes the meaning that the reference signal (RS) duration completely falls into the MG, and the length of the MG is greater than the duration in order to tune the RF to operate on the target frequency), and the MGRP will correspond to the SSB transmission periodicity TP1. The MGs having a second gap pattern from the three concurrent MG patterns marked as MG2 (referred to as "MG2" hereinafter for simplicity) are used for the CSI-RS based measurement, and then the MGL of MG2 will cover the CSI-RS duration TL2 and the MGRP of MG2 will correspond to the CSI-RS transmission periodicity TP2. The MGs having a third gap pattern from the three concurrent MG patterns marked as MG0 (referred to as "MG0" hereinafter for simplicity) are used for the PRS measurement, and then the MGL of MG0 will cover the PRS duration TL3 and the MGRP of MG0 will correspond to the PRS transmission periodicity TP3.

The respective RSs for the three measurement objectives may be arranged by the NW in the time domain such that they do not overlap with one another in time. For example, between the two RSs that have the same transmission periodicity (TP2 is equal to TP3), the CSI-RS on carrier f2 has a time offset TO2 relative to the PRS on carrier 3. Accordingly, the UE may be configured by the NW with MG2 having a time offset TO2 relative to MG0 for example via RRC signaling. Moreover, since the SSB on carrier f1 is arranged to have a time offset TO1 relative to the PRS on carrier 3, the MG1 is configure to have a corresponding time offset TO1 relative to MG0. The time offsets TO1 and TO2 may be configured appropriately so that there is a reasonable time interval between any two adjacent signals in the time domain. In the shown example, it will take time not significantly longer than the sum of the durations of the SSB, CSI-RS and PRS to complete the measurements for all the three measurement objectives within the time window TW1 or TW3. Since there are only SSBs of carrier f1 but no CSI-RS or PRS, MG overheads are low within the time window TW2.

Figure 11:
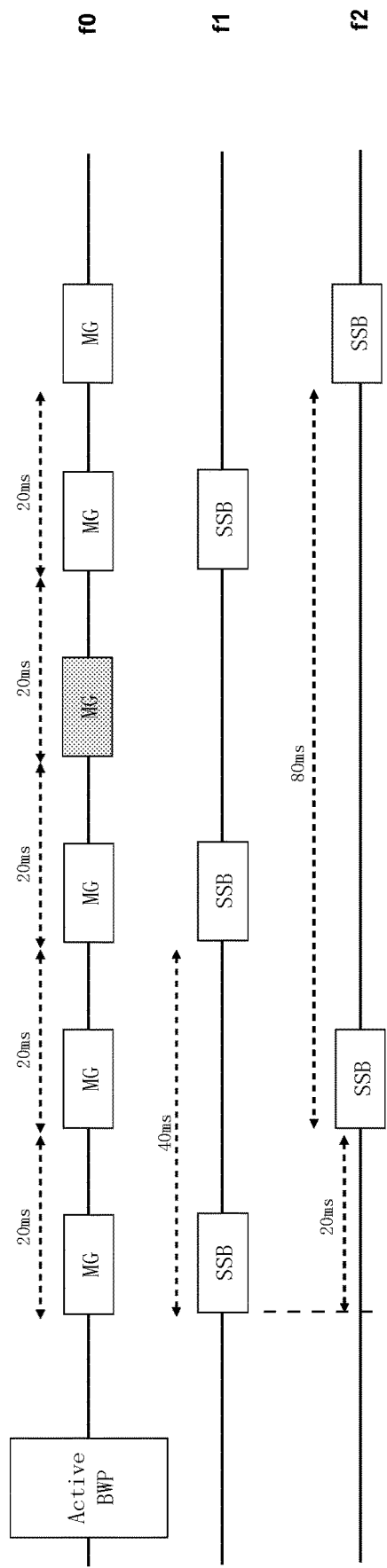
FIG. 11 illustrates a conventional MG pattern scheme for different configurations of the same measurement type.

FIG. 11 illustrates a conventional MG pattern scheme for different configurations of the same measurement type. The UE is working on carrier f0 and is configured with two measurement objectives: SSB based L3 measurement on carrier f1 and SSB based L3 measurement on carrier f2. The SSBs on carrier f1 have a 40 ms periodicity and the SSBs on carrier f2 have a 80 ms periodicity. There is a 20 ms time offset between the SSB on carrier f1 and the SSB on carrier f2. In the example, a single MG pattern with 20 ms periodicity is configured to cover both the SSBs on carrier f1 and the SSBs on carrier f2. Under this configuration, the MG in gray is redundant since the gap does not cover any RS on any carrier. Since the NW does not transmit data to the UE during the MG, even if the UE does not switch to another carrier but still works on carrier f0 during this MG, the UE cannot communicate data with the NW. Therefore, the time period for the MG in gray is neither used for performing measurement nor communicating data, which causes waste.

Figure 12:
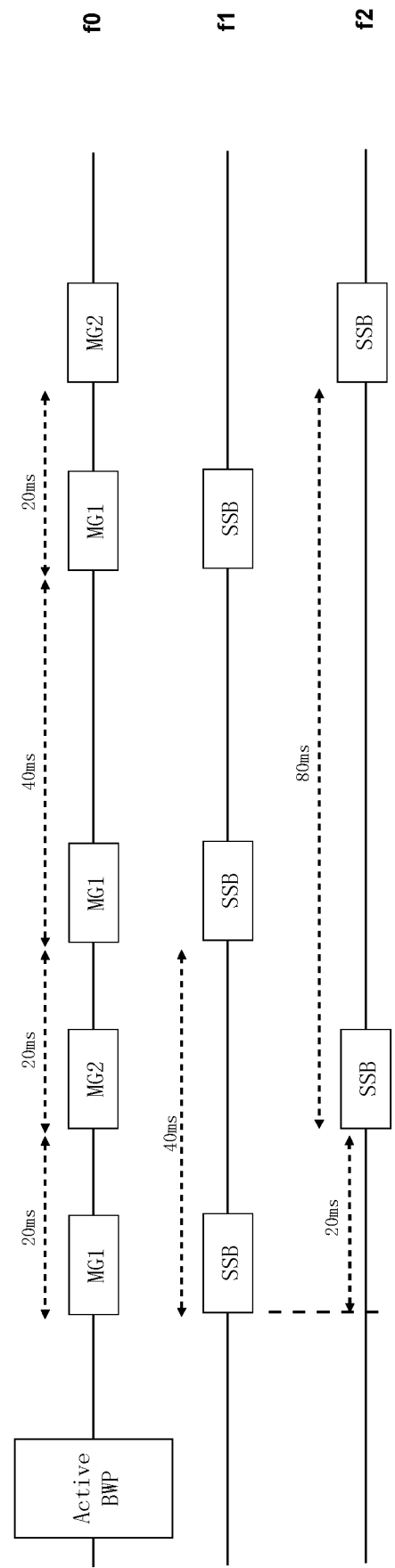
FIG. 12 illustrates an aspect of an exemplary possible concurrent MG pattern scheme for different configurations of the same measurement type, according to some embodiments.

FIG. 12 illustrates an aspect of an exemplary possible concurrent MG pattern scheme for different configurations of the same measurement type, according to some embodiments. Different configurations of the same measurement type may refer to the same type of RS, e.g., SSB in the shown example, with different time offsets and/or different periodicities. It will be appreciated that as long as any one of the time offset and periodicity of an RS is different from that of another RS, it may be considered as the same measurement type with different configurations. The working carrier of the UE and the configured measurement objectives are the same as those in the example shown in FIG. 11. The UE may be configured with different concurrent measurement gap patterns to perform the same type of measurement, that is, SSB based measurement in the shown example, with different configurations. For this example, the NW may configure two concurrent MG patterns, MG1 with a 40 ms periodicity and MG2 with a 80 ms periodicity, to cover measurements on both carriers f1 and f2, respectively. It can be seen that the wasted time caused by the MG in gray in FIG. 11 may be avoided.

Figure 13:
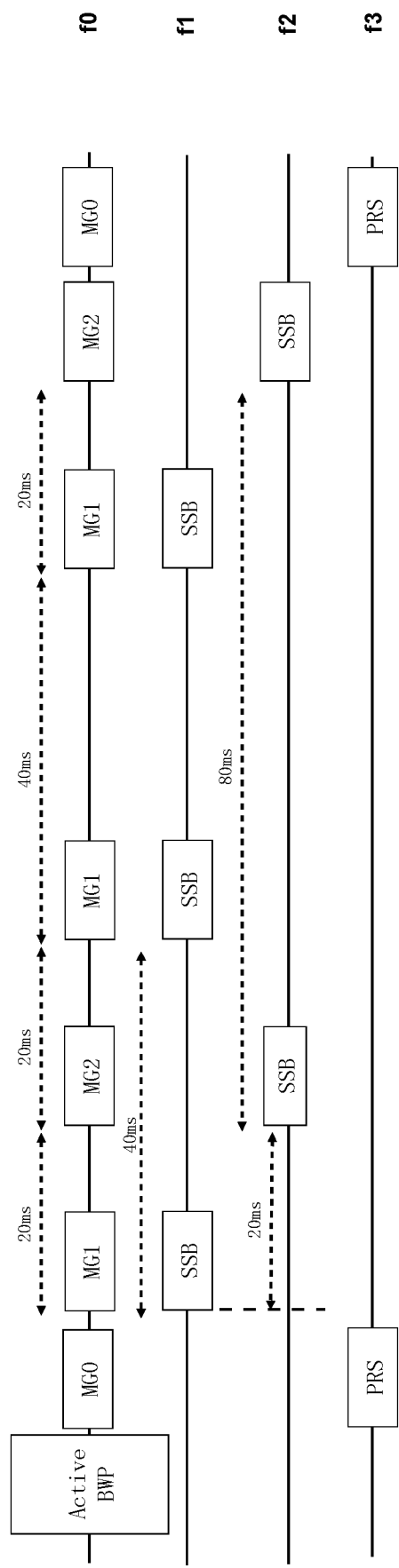
FIG. 13 illustrates an aspect of an exemplary possible concurrent MG pattern scheme for different measurement types and different configurations of the same measurement type, according to some embodiments.

FIG. 13 illustrates an aspect of an exemplary possible concurrent MG pattern scheme for different measurement types and different configurations of the same measurement type, according to some embodiments. The UE may be configured with different concurrent measurement gap patterns, MG1, MG2 and MG0, to perform measurements where some of the measurements may have different types and some of the measurements may have the same type but different configurations. In the shown example, the UE is working on carrier f0 and is configured with three measurement objectives: SSB based L3 measurement on carrier f1, SSB based L3 measurement on carrier f2 and PRS measurement for positioning on carrier f3. The SSBs on carrier f1 have a 40 ms periodicity and the SSBs on carrier f2 have a 80 ms periodicity. There is a 20 ms time offset between the SSBs on carrier f1 and the SSBs on carrier f2. The MG1, MG2 and MG0 from the three concurrent MG patterns may be used to perform the measurements on the carriers f1, f2 and f3, respectively.

Although not shown in the figures, it will be appreciated that multiple measurement objectives may be configured on a single carrier. In this case, multiple concurrent MG patterns may be configured so as to take the MGs with different gap pattern to perform the measurements for the different measurement objectives.

Figure 14:
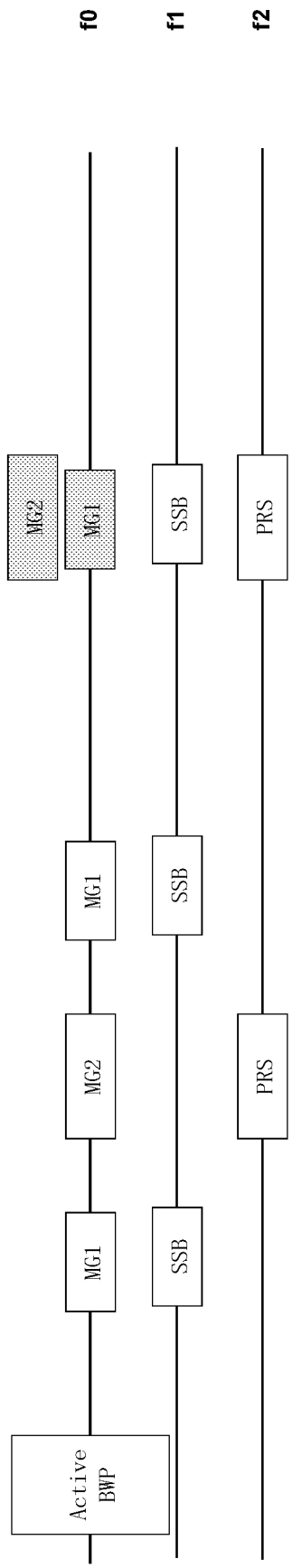
FIG. 14 illustrates an aspect of an exemplary possible concurrent MG pattern scheme with a concurrent MG pattern colliding with another, according to some embodiments.

According to embodiments of the present disclosure, different MGs from concurrent MG patterns may have the same configuration or different configurations, that is, the same time offset or different time offsets, the same MGL or different MGLs, and the same MGRP or different MGRPs. The NW may determine these configurations properly to try to avoid MG collision. However, in some cases. MG collision is inevitable. FIG. 14 illustrates an aspect of an exemplary possible concurrent MG pattern scheme with a concurrent MG pattern colliding with another, according to some embodiments. In the shown example, since a PRS occasion on carrier f2 is partially overlapped with an SSB occasion on carrier f1, the corresponding MG1 in gray collides with the MG2 in gray in time domain. The UE can only perform one measurement during the time period of the collided MGs. The length of the time period usually depends on the longer MGL, that is, MG2 in the shown example.

For the MG collision cases, if the NW knows which objective the UE measures during the MG (that is, the NW and the UE reach a consensus on the selection of the measurement objective), then the NW may accurately know the measurement period of the UE (that is, the time that the UE takes to complete all the measurement objectives). There are several options described below that are proposed in the disclosure.

Option 1—Leave the UE to Implement on which Carrier(s) to Measure.

Behaviors of the UE will not defined in 3GPP specifications. Either no RRM requirement is defined or RRM requirement is defined assuming UE may only measure one of the carriers. During the collision MG, the UE may autonomously select a measurement objective. The NW may assume that the UE measures an objective in a collision MG and measures another objective in the next collision MG. This will cause the measurement delay defined in the specification to be longer, which may not be expected.

Option 2—Prioritize Certain Measurement Type in the Specification.

Priorities for respective measurement types may be defined in the specification. For example, a mobility purpose measurement may be considered more important compared to a positioning purpose measurement. Therefore, a higher priority may be defined for SSB based measurement and a lower priority may be defined for PRS measurement in the specification. In this example, if the MG for SSB based measurement collides with the MG for PRS measurement as shown in FIG. 14, the UE may take the SSB based measurement on carrier f1 and discard the PRS measurement on carrier f2.

Option 3—Up to the Control of the NW.

The NW may indicate the UE on which measurement is prioritized. For example, a new indication (or priority information) may be added in the measurement objective part or measurement gap configuration part of the message (e.g., an RRC signaling). Once collision MG occurs, the UE follows the indication or priority information to perform measurement.

Option 4—Introduce UE Capability to Allow Concurrent Processing.

The UE may have a greater capability to support concurrent processing in the overlapped MG occasions. The new UE capability may be reported to the NW using an enumerated variable, such as {supported, non supported}, to indicate whether the concurrent processing is supported by the UE, or an integer variable, such as {1, 2, 3 . . . }, to indicate the number of carriers that can be measured simultaneously by the UE.

Exemplary Operations for a UE

FIG. 6 is a flowchart diagram illustrating an example method 600 for a UE, according to some embodiments. Aspects of the method 600 may be implemented by a wireless device such as a UE 106 illustrated in various of the Figures herein and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method 600 may operate as follows.

At 602, a wireless device (also referred to as "UE" hereinafter for simplicity) may encode a message for transmission to a NW including a UE capability information that includes an indication of whether concurrent MG patterns are supported by the UE. At 604, the wireless device may transmit the message to the NW. According to some embodiments, the indication of whether concurrent MG patterns are supported by the UE may include an enumerated variable, such as {supported, non supported}, to indicate whether concurrent MG patterns are supported by the UE. If the UE does not support concurrent MG patterns, only a single MG pattern may be configured for one or more measurements within a single time period. If the UE supports concurrent MG patterns, multiple concurrent MG patterns may be configured for one or more measurements within a single time period. In these embodiments, the UE only reports to the NW that it supports concurrent MG patterns but does not report the number of the supported concurrent MG patterns. The specification may specify the number of concurrent MG patterns that may be supported by UEs, for example, 2 or 3 concurrent MG patterns. If the UE can support the specified number of concurrent MG patterns, it may include the indication as "supported" into the UE capability information, otherwise it may include the indication as "non supported" into the UE capability information. The NW may configure the concurrent MG patterns for the UE according to the number specified in the specification in response to concurrent MG patterns being supported by the UE.

According to some embodiments, the UE capability information may further include an indication of the number of concurrent MG patterns that are supported by the UE in response to concurrent MG patterns being supported by the UE. In these embodiments, the indication of the number of supported concurrent MG patterns may include an integer variable, such as {2, 3 . . . }, to indicate the number of supported concurrent MG patterns. The NW may configure the concurrent MG patterns for the UE according to the indication of the number of supported concurrent MG patterns included in the UE capability information.

According to some embodiments, the indication of whether concurrent MG patterns are supported by the UE may include an integer variable, such as {1, 2, 3 . . . }. If the integer variable is equal to 1, an indication of concurrent MG patterns not being supported by the UE may be included. If the integer variable is greater than 1, an indication of concurrent MG patterns being supported by the UE and an indication of the number of supported concurrent MG patterns may be included.

The specifications may specify one or more gap pattern configurations being mandatory. For example, configurations with gap pattern IDs 0, 1, 13 and 14 defined in TS38.133 Table 9.1.2-1 are mandatory according to 3GPP specification Release 15. The NW may configure the concurrent MG patterns for the UE according to the indicated number from the UE or the specified number in the specification, and the mandatory supported MG patterns specified in the specification. According to some embodiments, the UE capability information may further include an indication of one or more MG pattern configurations that are supported by the UE in response to concurrent MG patterns being supported by the UE. It will be appreciated that the number of supported concurrent MG patterns by the UE may be the same as or different from the number of the MG pattern configurations that are supported by the UE. In an embodiment, the UE may support two concurrent MG patterns, referred to as MG0 and MG1, and may support two MG pattern configurations, referred to as CONF0 and CONF1. The NW may configure the UE with the MG0 having the CONF0 and the MG1 having the CONF1, respectively, each of the MG0 and the MG1 having the CONF0, or each of the MG0 and the MG1 having the CONF1 In another embodiment, the UE may support two concurrent MG patterns, referred to as MG0 and MG1, and may support one MG pattern configuration, referred to as CONF0. The NW may configure the UE with each of the MG0 and the MG1 having the CONF0. In another embodiment, the UE may support two concurrent MG patterns, referred to as MG0 and MG1, and may support three MG pattern configurations, referred to as CONF0, CONF1 and CONF2. The NW may allocate one or two configurations from the CONF0, CONF1 and CONF2 to the MG0 and MG1 as needed.

According to some embodiments, the indication of the one or more MG pattern configurations that are supported by the UE includes a bitmap string with each bit corresponding to an MG pattern defined in a 3GPP specification. In these embodiments, the support of multiple concurrent and independent MG patterns can be indicated as a bitmap string. Each bit may correspond to a corresponding gap pattern defined in TS38.133 Table 9.1.2-1. For example, if UE indicates a bitmap string as {1, 1, 0, 0, . . . , 0, 0}, the NW may configure MG pattern configuration ID 0 and 1 as concurrent and independent MG patterns for the UE.

According to some embodiments, the UE capability information mentioned above may be specified as one of the following options.

Option 1: Per UE

The UE capability information may be specified for the UE. In this case, a common set of concurrent MG patterns may be supported by the UE in any working mode, such as a carrier aggregation (CA) mode, dual connectivity (DC) mode, millimeter wave band mode or common operating band mode, and the like.

Option 2: Per Frequency Range (FR)

The UE capability information may be specified for each of FRs that are supported by the UE. The FRs (FR1 and FR2) in which NR can operate according to the present version of the specification are identified in the below table (Table 1) as described in clause 5.1 of TS 38.104.

TABLE 1

Definition of frequency ranges

| Frequency range designation | Corresponding frequency range |
|---|---|
| FR1 | 410 MHz-7125 MHz |
| FR2 | 24250 MHz-52600 MHz |

The UE may support a first set of concurrent MG patterns when working in FR1 and support a second set of concurrent MG patterns when working in FR2. Any of the first and second sets of concurrent MG patterns may include one or more MG patterns. As shown in Table 1, the FR1 includes a common operating band and the FR2 includes a millimeter wave band. Due to the higher mobility requirements for the UE working in FR1, the UE may support two concurrent MG patterns in FR1 so that it may measure more RSs more easily. However, the mobility requirements for the UE working in FR2 are relatively low, so the UE may only support a single MG pattern in FR2.

Option 3: Per Feature Set (Per Band Per Band-Combination)

The UE capability information may be specified for each of feature sets that are supported by the UE. The UE may support a first set of concurrent MG patterns for a first feature set and support a second set of concurrent MG patterns for a second feature set. Any of the first and second sets of concurrent MG patterns may include one or more MG patterns.

Option 4: Per Band or Per Band-Combination

The UE capability information may be specified for each of bands that are supported by the UE, or for each of band-combinations that are supported by the UE. The UE may support a first set of concurrent MG patterns for a first band (or band-combination) and support a second set of concurrent MG patterns for a second band (or band-combination). Any of the first and second sets of concurrent MG patterns may include one or more MG patterns.

Option 4 may be considered as partially overlapping with Option 3. A CA capable UE or a multi-radio DC (dual connectivity between E-UTRA and NR nodes, or between two NR nodes) capable UE may work in multiple bands simultaneously. Such a UE may have multiple RFs with each RF working within a band. For example, the UE may support two concurrent MG patterns when working within Band A and support a single MG pattern when working within Band B. For another example, a first band-combination Bands A+B may be used for frequency division duplex (FDD) transmission and reception, and a second band-combination Bands C+D may be sued for time division duplex (TDD) transmission and reception. The UE may only support one single MG pattern when working in the Bands A+B since a large amount of data being transmitted simultaneously on the uplink and downlink, and may support two or more concurrent MG patterns when working in the Bands C+D since the MG may only impact data transmission on one of the uplink and the downlink.

Option 5: Per Component Carrier (CC)

The UE capability information may be specified for each of CCs that are supported by the UE. A CA capable UE may support multiple CCs for intra-band to be aggregated. For example, when performing adjacent frequency measurement, if the target carrier f1 is close to the current carrier f0, the UE may widen the bandwidth of the current working RF and use the RF working at carrier f0 (instead of RF being tuned to the carrier f1) to measure the RS on carrier f1. In this way, the working frequencies of the RF may be operated concurrently, which may result in different concurrent MG patterns required by different CCs. Accordingly, the UE may support a first set of concurrent MG patterns for a first CC (or a first set of CCs) and support a second set of concurrent MG patterns for a second CC (or a second set of CCs). Any of the first and second sets of concurrent MG patterns may include one or more MG patterns.

Option 6: Per Bandwidth Part (BWP)

The UE capability information may be specified for each of carrier BWPs that are supported by the UE. According to the designation in 3GPP specification Release 15, a CC with a 100 MHz bandwidth may have up to four BWPs each with a 25 MHz bandwidth. For example, if the active BWP of carrier f) is closest to carrier f1, the bandwidth of the RF may be widened to measure the RS on carrier f1. Thus, different concurrent MG patterns may be required by different BWPs. Accordingly, the UE may support a first set of concurrent MG patterns for a first BWP (or a first set of BWPs) and support a second set of concurrent MG patterns for a second BWP (or a second set of BWPs). Any of the first and second sets of concurrent MG patterns may include one or more MG patterns.

According to some embodiments, the UE capability information may further include an indication of whether simultaneous measurements of multiple frequencies are supported by the UE or an indication of the number of frequencies that can be measured simultaneously by the UE. In an embodiment, the indication of whether simultaneous measurements of multiple frequencies are supported by the UE may include an enumerated variable, such as {supported, non supported}, to indicate whether simultaneous measurements of multiple frequencies are supported by the UE. In an embodiment, the indication of the number of frequencies that can be measured simultaneously by the UE may include an integer variable, such as {2, 3 . . . }, to indicate the number of supported frequencies that can be measured simultaneously. In an embodiment, the indication of whether simultaneous measurements of multiple frequencies are supported may include an integer variable, such as {1, 2, 3 . . . }, to indicate "non supported" when the integer variable is equal to 1 and to indicate the number of supported frequencies that can be measured simultaneously when the integer variable is greater than 1. When simultaneous measurements of multiple frequencies are supported by the UE, the NW may configure the UE with overlapped MG occasions in time domain.

The NW may configure the UE with multiple concurrent MG patterns in response to the UE capability including an indication of concurrent MG patterns being supported by the UE. According to some embodiments, the UE may allodially select a first of the configured multiple concurrent MG patterns to perform a first measurement and select a second of the configured multiple concurrent MG patterns to perform a second measurement.

According to Release 15 or 16 designation, in the MeasConfig information element of RRC signalling, the MG is configured in the measGapConfig part which is outside the measObjectToAddModList part that is used to configure measurement objectives. According to embodiments in the present disclosure, when UE is configured with multiple concurrent gap patterns, the NW may indicate which MG pattern will be used for measurement on each target carrier. That is, link each MG pattern with each individual measurement objective, for example, by configuring the MG in the measObjectToAddModList part of the MeasConfig information element.

According to some embodiments, the wireless device may receive a message from the NW including measurement objective information that includes an indication of an MG pattern associated with a measurement objective; and apply the MG pattern associated with the measurement objective to a measurement of the measurement objective. For example, the UE is configured with three measurement objectives on carriers f1, f2 and f3, respectively. The NW also configures three MG patterns MG1. MG2 and MG3, for the UE. In the measObjecToAddModList part of the MeasConfig information element, the NW may indicate MG1 is only used for measurement on carrier f1, MG2 is only used for measurement on carrier f2, and MG0 is only used for measurement on carrier f3.

According to some embodiments, the measurement objective information may include an indication of a first MG pattern associated with a first measurement objective and an indication of a second MG pattern associated with a second measurement objective. In these embodiments, the wireless device may apply the first MG pattern to a measurement of the first measurement objective, and apply the second MG pattern to a measurement of the second measurement objective. In response to an MG according to the first MG pattern collides with an MG according to the second MG pattern in a first time window and an MG according to the first MG pattern collides with an MG according to the second MG pattern in a second time window, the wireless device may perform the measurement of the first measurement objective at the first time window and perform the measurement of the second measurement objective at the second time window.

According to some embodiments, the measurement objective information may include an indication of a first MG pattern associated with a first measurement objective and an indication of a second MG pattern associated with a second measurement objective. In these embodiments, the wireless device may apply the first MG pattern to a measurement of the first measurement objective, and apply the second MG pattern to a measurement of the second measurement objective. In response to an MG according to the first MG pattern collides with an MG according to the second MG pattern in time domain, the wireless device may prioritize between the measurement of the first measurement objective and the measurement of the second measurement objective based on information in a 3GPP specification (as described in the Option 2 for the MG collision cases) or an indication from the NW (e.g., the priority information for respective measurement objectives or the collision indication for respective MG patterns to be described below); and perform a measurement according to the prioritization between the measurement of the first measurement objective and the measurement of the second measurement objective.

FIG. 7 is a flowchart diagram illustrating an example method 700 for a UE, according to some embodiments. Aspects of the method 700 may be implemented by a wireless device such as a UE 106 illustrated in various of the Figures herein and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method 700 may operate as follows.

At 702, a wireless device (also referred to as "UE" hereinafter for simplicity) may encode a message for transmission to a network (NW) including a UE capability information that includes an indication of concurrent first and second measurement gap (MG) patterns that are supported by the UE, wherein the first MG pattern is independent with the second MG pattern. At 704, the wireless device may transmit the message to the NW. After that, the wireless device may receive a message from the NW including measurement objective information that includes an indication of first and second measurement objectives respectively associated with the first and second MG patterns, and apply the first and second MG patterns to respective measurements of the first and second measurement objectives. In some embodiments, the first and second MG patterns have different pattern configurations. In some embodiments, the first and second MG patterns have an identical pattern configuration.

According to some embodiments, the wireless device may determine measurement requirement for each of the first and second measurement objectives based on a configuration of the respective one of the first and second MG patterns; and perform the measurements of the first and second measurement objectives according to respective measurement requirements. Measurement requirements including requirements for PSS/SSS detection, time index detection and measurement period. When multiple concurrent MG patterns are supported, these measurement requirements shall follow the corresponding MG pattern configurations. Take measurement period in FR1 for inter-frequency case for example, which is identified in the below table (Table 2) as described in clause 9.3.5 of TS 38.133.

TABLE 2

Measurement period for inter-frequency measurements with gaps (Frequency FR1)

| Condition $^{NOTE1, 2}$ | $T_{SSB\_measurement\_period\_inter}$ |
|---|---|
| No DRX | Max(200 ms, 8 × Max(MGRP, SMTC period)) × $CSSF_{inter}$ |
| DRX cycle ≤ 320 ms | Max(200 ms, Ceil(8 × 1.5) × Max(MGRP, SMTC period, DRX cycle)) × $CSSF_{inter}$ |
| DRX cycle > 320 ms | 8 × DRX cycle × $CSSF_{inter}$ |

NOTE 1:
DRX or non DRX requirements apply according to the conditions described in clause 3.6.1
NOTE 2:
In EN-DC operation, the parameters, timers and scheduling requests referred to in clause 3.6.1 are for the secondary cell group. The DRX cycle is the DRX cycle of the secondary cell group.

According to some embodiments, MGRP in Table 1 may be replaced by $MGRP_i$, where $MGRP_i$ is the $i^{th}$ MG pattern indicated for $i^{th}$ measurement objective for example on target carrier i. For example, $MGRP_1$=40 ms for the first MG pattern and $MGRP_2$=80 ms for the second MG pattern will be used to determine the measurement periods on carriers f1 and f2, respectively. Thus, the measurement period in FR1 for inter-frequency measurements may be defined in the below table (Table 3):

TABLE 3

Measurement period for inter-frequency measurements with gaps (Frequency FR1)

| Condition $^{NOTE1, 2}$ | $T_{SSB\_measurement\_period\_inter}$ |
|---|---|
| No DRX | Max(200 ms, 8 × Max($MGRP_i$, SMTC period)) × $CSSF_{inter}$ |
| DRX cycle ≤ 320 ms | Max(200 ms, Ceil(8 × 1.5) × Max($MGRP_i$, SMTC period, DRX cycle)) × $CSSF_{inter}$ |
| DRX cycle > 320 ms | 8 × DRX cycle × $CSSF_{inter}$ |

NOTE 1:
DRX or non DRX requirements apply according to the conditions described in clause 3.6.1
NOTE 2:
In EN-DC operation, the parameters, timers and scheduling requests referred to in clause 3.6.1 are for the secondary cell group. The DRX cycle is the DRX cycle of the secondary cell group.

Exemplary Methods of Operations for a NW Element

FIG. 8 is a flowchart diagram illustrating an example method 800 for a NW element, according to some embodiments. Aspects of the method 800 may be implemented by a base station such as a BS 102 illustrated in various of the Figures herein and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method 800 may operate as follows.

At 802, a wireless device (also referred to as "NW" hereinafter for simplicity) may receive a message from a user equipment (UE) including a UE capability information that includes an indication of concurrent measurement gap (MG) patterns. At 804, the wireless device may determine, for each of measurement objectives for the UE, an associated MG pattern from the concurrent MG patterns. At 806, the wireless device may encode a message for transmission to the UE including measurement objective information that includes an indication of the measurement objectives and associated MG patterns. At 808, the wireless device may transmit the message to the UE.

The measurement objectives that configured by the NW to the UE may include first and second measurement objectives. According to some embodiments, a measurement type of the first measurement objective is different from a measurement type of the second measurement objective, which is similar to the case shown in FIG. 10 described above. In these embodiments, the NW may determine an associated MG pattern from the concurrent MG patterns for each measurement type. According to some embodiments, a measurement type of the first measurement objective is the same as a measurement type of the second measurement objective but a configuration of the first measurement objective is different from a configuration of the second measurement objective, which is similar to the case shown in FIG.

11 described above. In these embodiments, the NW may determine an associated MG pattern from the concurrent MG patterns for each configuration of the same measurement type. It will be appreciated that a frequency corresponding to the first measurement objective is different from or the same as a frequency corresponding to the second measurement objective.

According to some embodiments, the indication of the measurement objectives and associated MG patterns may include time offsets for respective MG patterns, and thus the MGs according to the concurrent MG patterns that configured to the UE may not be aligned in time. It will be appreciated that the MG patterns will match the patterns of RSs for the measurement objectives. According to some embodiments, the NW may set timing for RSs such that there is a time offset between a first of the RSs and a second of the RSs, and thus the RSs for the measurement objectives that configured to the UE may not be aligned in time as well. The NW may properly configure the time offset for each RS and for each MG pattern so as to reduce/avoid MG collision. As described above, if the UE has a greater capability to support concurrent processing in the overlapped MG occasions, e.g., the UE may measure multiple carriers simultaneously, the NW may configure overlapped RS occasions and/or overlapped MG occasions for the UE.

According to some embodiments, the indication of the measurement objectives and associated MG patterns may include priority information for respective measurement objectives or a collision indication for respective MG patterns. The UE may prioritize between the measurements of the measurement objectives based on the priority information for respective measurement objectives or the collision indication for respective MG patterns from the NW, and perform a measurement according to the prioritization between the measurements. The priority information for respective measurement objectives may be used to indicate which measurement objective has a higher priority and which measurement objective has a lower priority. Once collision MG occurs, the UE follows the priority information to perform the measurement having the higher priority and discard the measurement having the lower priority. The collision indication for respective MG patterns may be used to indicate whether an MG according to the MG pattern will be discarded when collision MG occurs. The UE may follow the collision indication to perform the corresponding measurement.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Those skilled in the art may clearly know from the above embodiments that the present disclosure may be implemented by software with necessary hardware, or by hardware, firmware and the like. Based on such understanding, the embodiments of the present disclosure may be embodied in part in a software form. The computer software may be stored in a readable storage medium such as a floppy disk, a hard disk, an optical disk or a flash memory of the computer. The computer software comprises a series of instructions to make the computer (e.g., a personal computer, a service station or a network terminal) execute the method or a part thereof according to respective embodiment of the present disclosure.

The present disclosure being thus described, it will be obvious that the same may be varied in many ways. Such variations are not to be regarded as a departure from the spirit and scope of the present disclosure, and all such modifications as would be obvious to those skilled in the art are intended to be included within the scope of the following claims.

What is claimed is:

1. An apparatus, comprising:
  processor circuitry configured to cause a user equipment (UE) to:
    encode a message for transmission to a network (NW) including a UE capability information that includes an indication of whether concurrent measurement gap (MG) patterns are supported by the UE, wherein the UE capability information further includes an indication of one or more MG pattern configurations that includes a bitmap string with each bit corresponding to an MG pattern; and
    transmit the message to the NW.

2. The apparatus according to claim 1, wherein the UE capability information further includes an indication of a number of concurrent MG patterns that are supported by the UE in response to concurrent MG patterns being supported by the UE.

3. The apparatus according to claim 1, wherein the UE capability information further includes the indication of the one or more MG pattern configurations that are supported by the UE in response to concurrent MG patterns being supported by the UE.

4. The apparatus according to claim 3, wherein the indication of the one or more MG pattern configurations that are supported by the UE includes the bitmap string with each bit corresponding to an MG pattern defined in a 3GPP specification.

5. The apparatus according to any of claim 1, wherein the UE capability information is specified for:
  the UE;
  each of frequency ranges that are supported by the UE;
  each of feature sets that are supported by the UE;
  each of bands that are supported by the UE;
  each of band-combinations that are supported by the UE;
  each of component carriers (CCs) that are supported by the UE; or
  each of carrier bandwidth parts (BWPs) that are supported by the UE.

6. The apparatus according to claim 1, wherein the processor circuitry is further configured to:
  receive a message from the NW including measurement objective information that includes an indication of a first MG pattern associated with a first measurement objective; and
  apply the first MG pattern to a measurement of the first measurement objective.

7. The apparatus according to claim 6, wherein the measurement objective information further includes an indication of a second MG pattern associated with a second measurement objective, and the processor circuitry is further configured to:
apply the second MG pattern to a measurement of the second measurement objective; and
in response to an MG according to the first MG pattern colliding with an MG according to the second MG pattern in a first time window and an MG according to the first MG pattern colliding with an MG according to the second MG pattern in a second time window:
perform the measurement of the first measurement objective at the first time window and perform the measurement of the second measurement objective at the second time window.

8. The apparatus according to claim 6, wherein the measurement objective information further includes an indication of a second MG pattern associated with a second measurement objective, and the processor circuitry is further configured to:
apply the second MG pattern to a measurement of the second measurement objective; and
in response to an MG according to the first MG pattern colliding with an MG according to the second MG pattern in time domain:
prioritize between the measurement of the first measurement objective and the measurement of the second measurement objective based on information in a 3GPP specification or an indication from the NW; and
perform a measurement according to the prioritization between the measurement of the first measurement objective and the measurement of the second measurement objective.

9. The apparatus according to claim 1, wherein the UE capability information further includes an indication of whether simultaneous measurements of multiple frequencies are supported by the UE or an indication of a number of frequencies that can be measured simultaneously by the UE.

10. A method for a user equipment (UE), comprising:
encoding a message for transmission to a network (NW) including a UE capability information that includes an indication of concurrent first and second measurement gap (MG) patterns that are supported by the UE, wherein the first MG pattern is independent from the second MG pattern; and
transmitting the message to the NW,
wherein the indication includes a bitmap string with a first bit corresponding to the first MG pattern and a second bit corresponding to the second MG pattern.

11. The method according to claim 10, further comprising:
receiving a message from the NW including measurement objective information that includes an indication of first and second measurement objectives respectively associated with the first and second MG patterns; and
applying the first and second MG patterns to respective measurements of the first and second measurement objectives.

12. The method according to claim 11, further comprising:
determining a measurement requirement for each of the first and second measurement objectives based on a configuration of the respective one of the first and second MG patterns; and
performing the measurements of the first and second measurement objectives according to respective measurement requirements.

13. The method according to claim 11, wherein the first and second MG patterns have different pattern configurations or have an identical pattern configuration.

14. The method according to claim 10, wherein the UE comprises processor circuitry.

15. A method for a network element, the method comprising:
receiving a message from a user equipment (UE) including a UE capability information that includes an indication of concurrent measurement gap (MG) patterns, wherein the indication includes a bitmap string with each bit corresponding to an MG pattern;
determining, for each of measurement objectives for the UE, an associated MG pattern from the concurrent MG patterns;
encoding a message for transmission to the UE including measurement objective information that includes an indication of the measurement objectives and associated MG patterns; and
transmitting the message to the UE.

16. The method according to claim 15, wherein the measurement objectives include first and second measurement objectives, and wherein:
a measurement type of the first measurement objective is different from a measurement type of the second measurement objective; and/or
a measurement type of the first measurement objective is the same as a measurement type of the second measurement objective and a configuration of the first measurement objective is different from a configuration of the second measurement objective.

17. The method according to claim 15, wherein the measurement objectives include first and second measurement objectives, and wherein a frequency corresponding to the first measurement objective is different from or the same as a frequency corresponding to the second measurement objective.

18. The method according to claim 15, wherein the indication of the measurement objectives and associated MG patterns includes time offsets for respective MG patterns, and wherein the time offsets are configured to reduce/avoid MG collision.

19. The method according to claim 15, wherein the indication of the measurement objectives and associated MG patterns includes priority information for respective measurement objectives or includes a collision indication for respective MG patterns.

20. The method according to claim 15, further comprising:
setting timing for reference signals such that there is a time offset between a first of the reference signals and a second of the reference signals.

* * * * *